(12) United States Patent
Braam et al.

(10) Patent No.: US 7,292,621 B2
(45) Date of Patent: Nov. 6, 2007

(54) METHOD FOR DETECTING MULTIPATH SIGNALS

(75) Inventors: Reinhold Braam, Rhede (DE); Markus Imhof, Ulm (DE); Mathias Ludwig, Mettmann (DE)

(73) Assignee: Siemens Aktiengesellschaft, Munich (DE)

( * ) Notice: Subject to any disclaimer, the term of this patent is extended or adjusted under 35 U.S.C. 154(b) by 611 days.

(21) Appl. No.: 10/477,288

(22) PCT Filed: May 8, 2001

(86) PCT No.: PCT/DE01/01740

§ 371 (c)(1),
(2), (4) Date: Mar. 16, 2004

(87) PCT Pub. No.: WO02/091607

PCT Pub. Date: Nov. 14, 2002

(65) Prior Publication Data

US 2004/0151232 A1    Aug. 5, 2004

(51) Int. Cl.
H04B 1/707    (2006.01)
(52) U.S. Cl. ........................................ 375/148; 375/150

(58) Field of Classification Search ................ 375/148, 375/150; 455/504, 506, 67.16
See application file for complete search history.

(56) References Cited

U.S. PATENT DOCUMENTS

| 5,648,983 | A |   | 7/1997 | Kostic et al. |
| 5,818,866 | A | * | 10/1998 | Wilk ........................... 375/149 |
| 5,969,975 | A | * | 10/1999 | Glass et al. ................. 708/490 |
| 6,181,732 | B1 |   | 1/2001 | Komatsu |
| 6,324,210 | B1 | * | 11/2001 | Yang et al. .................. 375/152 |
| 6,996,157 | B2 | * | 2/2006 | Ohsuge ....................... 375/148 |

FOREIGN PATENT DOCUMENTS

| EP | 1 096 694 | 5/2001 |
| WO | WO99/63677 | 12/1999 |

* cited by examiner

*Primary Examiner*—Chieh M. Fan
*Assistant Examiner*—Aristocratis Fotakis
(74) *Attorney, Agent, or Firm*—Bell, Boyd & Lloyd LLP

(57) ABSTRACT

A method is provided for detecting multipath signals which includes the following steps: a total impulse response, composed essentially of multipath signals, is cross-correlated with a reference signal and a maximum of the result of the cross-correlation is determined and saved.

9 Claims, 5 Drawing Sheets

METHOD FOR DETECTING MULTIPATH SIGNALS

BACKGROUND OF THE INVENTION

The present invention relates to a method for detecting multipath signals, in particular for operating a RAKE receiver and further relates to an associated RAKE receiver.

Signals generally propagate over two or more paths in one mobile radio channel (multipath propagation). Each individual received signal has a different propagation time, amplitude and Doppler shift, corresponding to its transmission path. The various received signals are superimposed at the antenna of a receiver either constructively or destructively, thus making it harder to detect the symbols transmitted via the signals.

In particular, the multipath propagation of a radio signal such as this results in channel impulse responses over an extended time, which lead to a delay spread and thus to a shifted time reference between the individual symbols in the transmission signal. In mobile radio systems which operate using the Wideband Code Division Multiplex (W-CDMA) method, this then requires that special receivers (RAKE receivers) be used for processing the multipath signals.

A RAKE receiver such as this allows a considerable gain as a result of the use of multipath signals which arrive with different propagation time delays at a receiving antenna of a mobile radio. This is done by the signal coming from the antenna being processed in the receiver in two or more paths, the so-called "fingers" of the RAKE receiver. Each of these fingers is set, in each case, with an optimized phase angle of the pseudo-noise sequences which have been used for the coding of a signal to be transmitted via the mobile radio channel, to one respective component of the received multipath signals.

In an IS-95 mobile radio system, a RAKE receiver in a mobile station has at least three such fingers, and a base station has at least four such fingers. Furthermore, both the mobile station and the base station each have at least one "search finger" which continuously looks for stronger multipath signals. As soon as the search finger finds a stronger multipath signal, the finger on the previously weakest multipath signal is optimally set to the new, stronger multipath signal. Typically, this makes it possible to demodulate up to three of the strongest multipath signals in the mobile station and up to four of the strongest multipath signals in the base station, with a time delay of at least 0.8 to 1 µs, and to combine them via maximum ratio combining.

In this case, it is particularly important to detect the time reference between the individual multipath signals exactly; that is, to define the optimum "finger position". A specially tuned filter, a so-called matched filter, thus uses a sequence or a pilot sequence which is known in the receiver to produce the overall impulse response or channel impulse response of a received signal, on the basis of which the position of the individual fingers can be determined. However, the overall impulse response does not always allow detection of all the relevant finger positions. Particularly when adjacent fingers differ, for example, only by a very short delay time of less than the chip duration, reliable detection of the position and of the number of the fingers is difficult.

Known methods for detection of the finger positions are, however, highly computation intensive since they have a complexity of O(N), where N is the length of the overall impulse response.

An object of the present invention is, therefore, to propose a method for detecting multipath signals and a corresponding RAKE receiver whose data processing is less complex than the known detection methods, thus allowing fundamentally shorter adjustment times and a reduced processor capacity requirement.

SUMMARY OF THE INVENTION

The idea on which the present invention is based is to use the overall impulse response to determine peaks or maxima successively via cross-correlation. Once a first maximum has been determined, the overall impulse response is reduced by a reference signal, which was cross-correlated with the overall impulse response in order to determine the first maximum. As such, maxima which indicate the possible position of fingers are determined step-by-step from the overall impulse response via the reference signal.

The method of the present invention accordingly relates to a method for detecting multipath signals, particularly for operating a RAKE receiver, having the following steps:
 a) cross-correlation of an overall impulse response with a reference signal;
 b) determination and storage of a maximum of the result of the cross-correlation and of a proportionality factor $\alpha$;
 c) (if appropriate, repeated) reduction of the overall impulse response by the reference signal scaled by $\alpha$; and
 d) carrying out steps a) to c) using the overall impulse response reduced by the scaled reference signal until a predetermined number of maxima have been obtained, or until the scaling factor $\alpha$ falls below a predetermined value.

This method allows signals contained in the overall impulse response to be identified even when they have only very short propagation time differences; that is to say, they are very close to one another in time. Normally, short propagation time differences such as these between two signals results in a pulse which is transmitted by the signals arriving at a receiver extended in time. However, this is highly disadvantageous for the detection of pulses that are close to one another; for example, in the case of chips in a signal transmitted via CDMA. Furthermore, the method according to the invention involves considerably fewer computational steps than the methods which are known from the prior art. While the first two iteration steps for the determination or selection of the first two maxima have a complexity of O(N), all the further iteration steps now have only a complexity of O(E2), where E is the width of the reference signal and N is the length of the overall impulse response.

The method of the present invention is preferably used in a RAKE receiver. As already mentioned, RAKE receivers are used, in particular in code-division multiplex mobile radio systems. In principle, a RAKE receiver uses the propagation time differences between multipath signals by having two or more paths or fingers which are each set to the phase angle of one signal from the multipath signals. The signals which are optimized in the individual paths or fingers of the RAKE receiver are then combined to form an overall received signal. The method according to the present invention allows the operation of a RAKE receiver to be improved considerably, particularly with regard to an overall impulse response for individual signal components which have only very short propagation time differences (approximately ¼ of a chip).

The reference signal which is used for the method of the present invention is preferably a finger pattern which corresponds to a typical mobile radio channel. In this case, the expression "a typical mobile radio channel" refers to a mobile radio channel which has limited propagation time differences resulting from multipath propagation of transmitted signals, and which represents a good approximation of a large number of actual mobile radio channels.

The reference signal is preferably scaled such that a scaled reference signal essentially matches the cross-correlation maximum determined in step b) of the method. This considerably improves the efficiency of step c) of the method.

In one preferred embodiment of the present invention, multiply and accumulate operations are essentially carried out while carrying out steps a) to d). These operations considerably improve the efficiency of the present method in comparison to the methods which are known from the prior art, since a multiply and an accumulate operation can be carried out with considerably less computational complexity than the operations of squaring, addition, subtraction and multiplication that are required for known methods.

Finally, the present invention relates to a receiver for carrying out the inventive method, which has two or more paths or fingers for processing of received multipath signals. According to the present invention, the receiver has a cross-correlator for cross-correlation of an overall impulse response with a reference signal, a memory for the overall impulse response, and a scalar and subtractor for reducing the overall impulse response by the reference signal.

The cross-correlator, the memory and the scalar and subtractor are preferably in the form of program routines in a program for a signal processor for processing the overall impulse response, or are in the form of programmable or hard-wired logic; in particular, in an ASIC. A signal processor has special functions and/or commands for signal processing and can, thus, carry out the abovementioned program routines very efficiently. Furthermore, a signal processor such as this can be operated at a very high clock frequency so as to make it possible to process the high data rates that occur. Implementation in the form of logic has the advantage that it is very fast and can process even higher data rates.

Additional features and advantages of the present invention are described in, and will be apparent from, the following Detailed Description of the Invention and the Figures.

DETAILED DESCRIPTION OF THE INVENTION

The basic procedure for the method according to the present invention will be explained briefly in the following text using an exemplary embodiment and with reference to FIG. 1. Examples of the profiles of the overall impulse response and the search pattern and/or reference signal will then be explained with reference to FIGS. 2, 3, 4 and 5.

Figure 1:
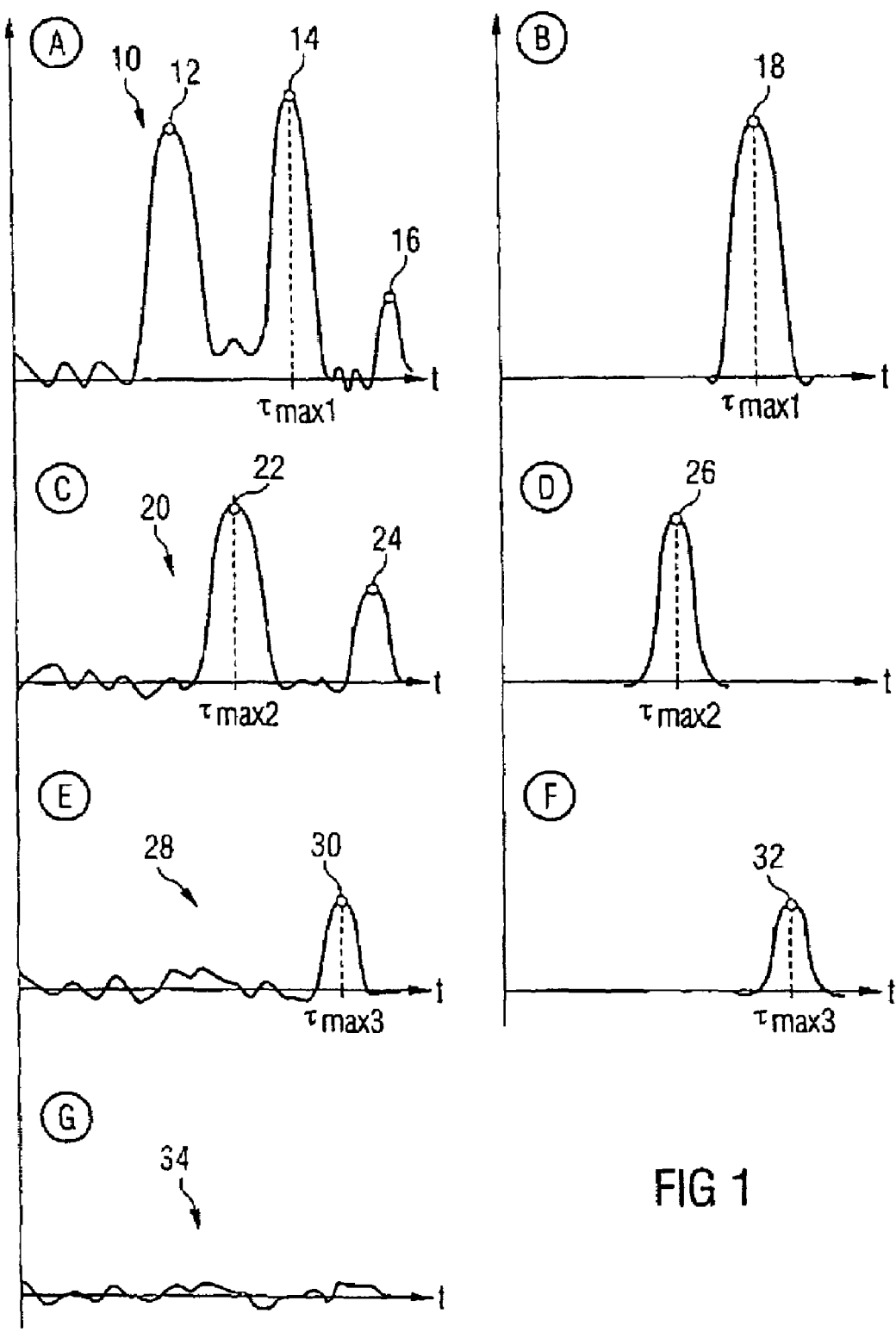
FIG. 1 uses signal profiles to show the processing of an overall impulse response of received multipath signals on the basis of the method according to the present invention.

The diagram A in FIG. 1 shows the overall impulse response 10 of received multipath signals. The overall impulse response 10 essentially has three maxima 12, 14 and 16, which occur at different reception times. Using the method according to the present invention, the overall impulse response 10 is cross-correlated with a reference signal (which is not illustrated). The result of the cross-correlation and the determination of the maximum and of the scaling factor result in the signal which is illustrated in the diagram B, which essentially has one maximum 18, which corresponds to the maximum 14 at the time $\tau_{max1}$ in the diagram A, likewise at the time $\tau_{max1}$.

In the next step, the overall impulse response 10 as illustrated in the diagram A is reduced by the scaled reference signal. The result of this subtraction is illustrated in the diagram C in FIG. 1. The signal 20 which is illustrated in the diagram C now has essentially two maxima 22 and 24. The maximum 22 at the time $\tau_{max2}$ will be determined from the signal 20 in a next step. The determination process is once again carried out via the cross-correlation process based on the method according to the present invention. The result of the cross-correlation process is illustrated in the diagram D. This has a maximum 26 at the time $\tau_{max2}$, which corresponds to a second signal component in the overall impulse response.

The signal 20 which is illustrated in diagram C is once again reduced by the scaled reference signal, thus resulting in the signal 28 as illustrated in the diagram E, which essentially has only one maximum 30 at the time $\tau_{max3}$ which corresponds to a third signal component in the overall impulse response 10. Finally, after cross-correlation of the signal 28 as illustrated in the diagram E via the reference signal and subsequent determination, the maximum 32 which is illustrated in the diagram F is obtained at the time $\tau_{max\,3}$.

In the next step, the signal 28 as illustrated in the diagram E is once again reduced by the scaled reference signal, thus resulting in the signal 34 as illustrated in the diagram G. This signal 34 essentially includes only noise components so that the method according to the present invention for detection of multipath signals ends at this point. Specifically, this means that the maxima 18, 26 and 32 which are illustrated in the diagrams B, D and F have been extracted on the basis of different propagation paths and propagation times in the mobile radio channel.

Figure 2:
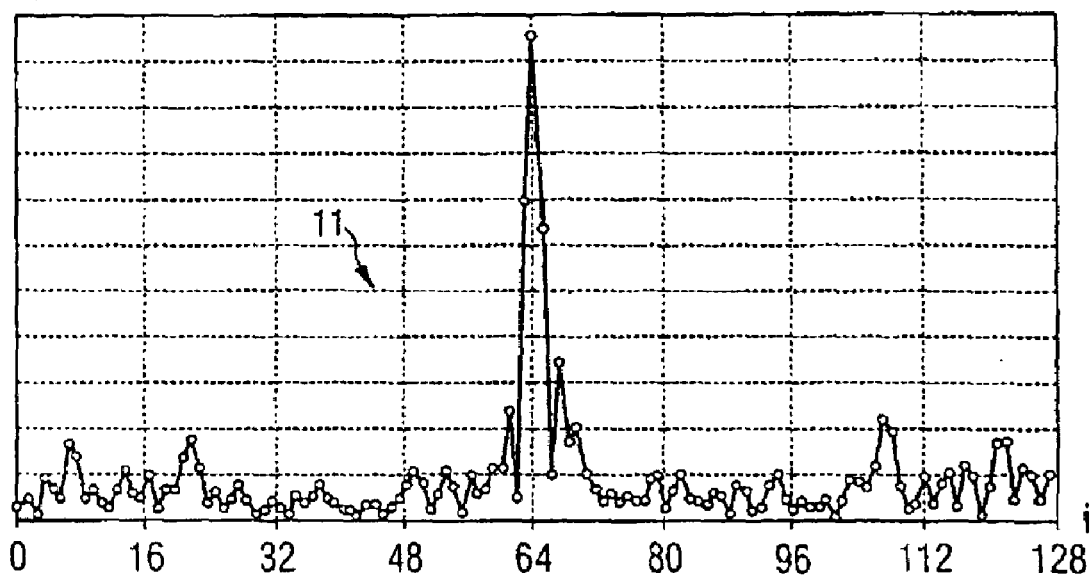
FIG. 2 shows an example of the profile of a channel impulse response or overall impulse response of a mobile radio channel.
Figure 5:
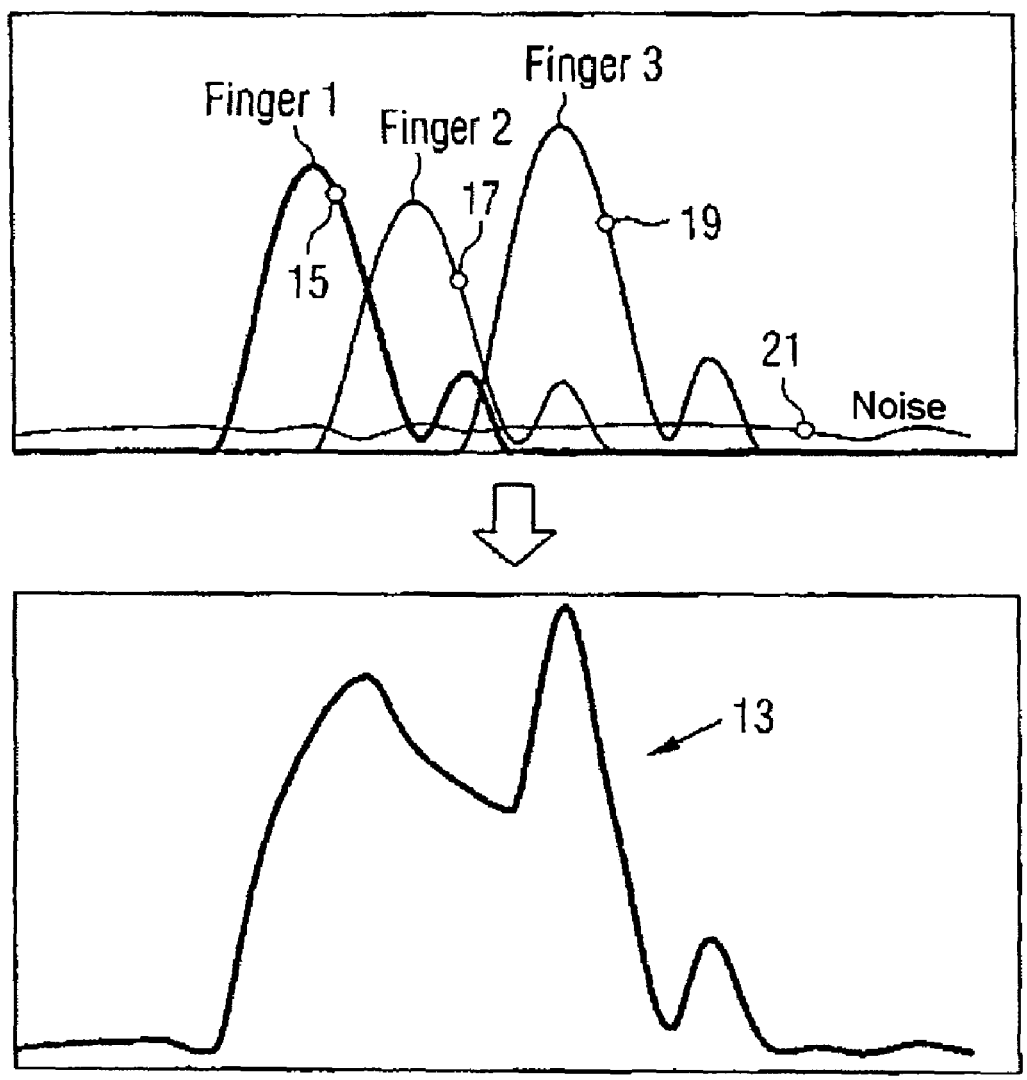
FIG. 5 shows a further example of the profile of an overall impulse response for a mobile radio channel, which essentially has three individual pulses and a noise component.

FIG. 2 shows an example of the profile of an overall impulse response 11 after passing through a matched filter in a RAKE receiver. The sample value i is plotted on the abscissa, corresponding to a specific reception time. The overall impulse response includes signal components from the various propagation paths in one mobile radio channel. By way of example, FIG. 5 shows how an overall impulse response 13 such as this is formed from superimposition of two or more individual pulses 15, 17, 19 and a noise component 21. The upper diagram in FIG. 5 shows the noise component 21 with "noise". Furthermore, FIG. 5 shows three individual pulses 15, 17, 19 with finger 1, finger 2 and finger 3. The individual pulses each correspond to one propagation path and typically arrive at different times in a receiver. The overall impulse response 13, which is composed of the noise component 21 "noise" and the three individual pulses 15, 17, 19 finger 1 to finger 3, is shown in the lower diagram. The object of the receiver is now to use this overall impulse response to determine start times of a transmitted data block. These start points can be used for reception. The start points correspond to finger positions; that is to say, in principle, to the reception times of the individual fingers. A simple maximum search for determination of the finger positions in the overall impulse response is, however, highly inaccurate and leads to poor reception. In a corresponding manner to the procedure described with reference to FIG. 1, the overall impulse response is searched for a pattern which corresponds to the impulse response of a single propagation path in the mobile radio channel. As soon as this pattern has been found, it is subtracted from the overall impulse response. This procedure is repeated until no more significant maxima occur in the continually reduced overall impulse response.

Figure 3:
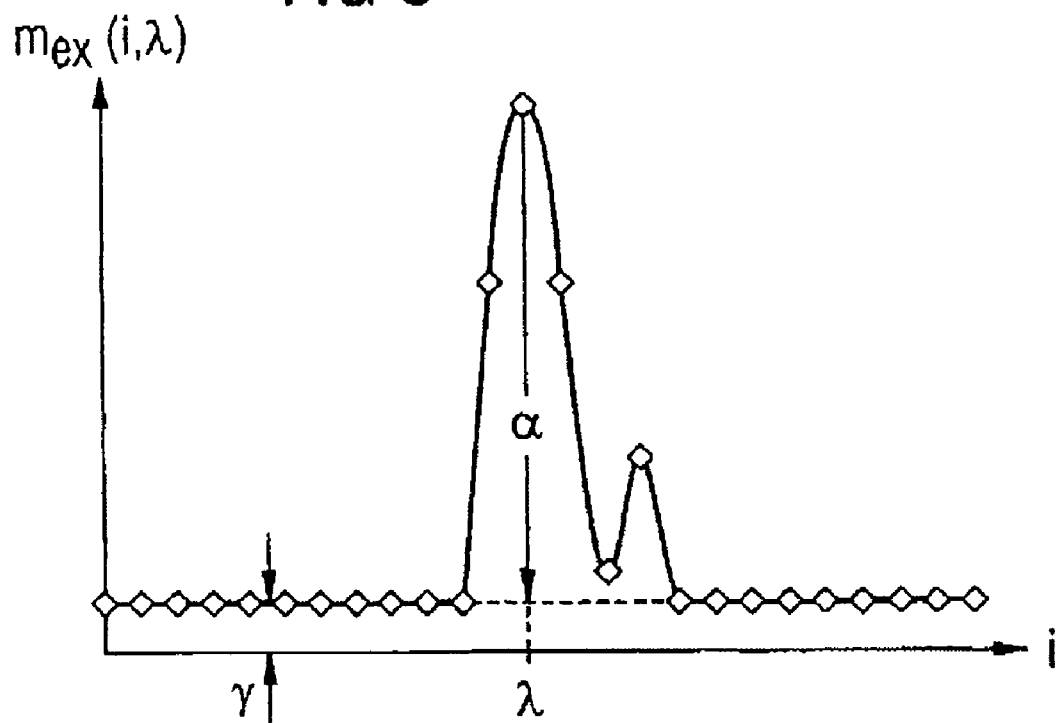
FIG. 3 shows the profile of a virtual channel impulse response or overall impulse response of the mobile radio channel whose actual overall impulse response is illustrated in FIG. 2.

FIG. 3 shows an example of the profile of a virtual overall impulse response. This virtual overall impulse response is composed of a search pattern or reference signal, whose magnitude can be scaled, and of an additional component α. The search pattern is scaled using a scaling factor α. The component γ corresponds to a noise component.

Figure 4:
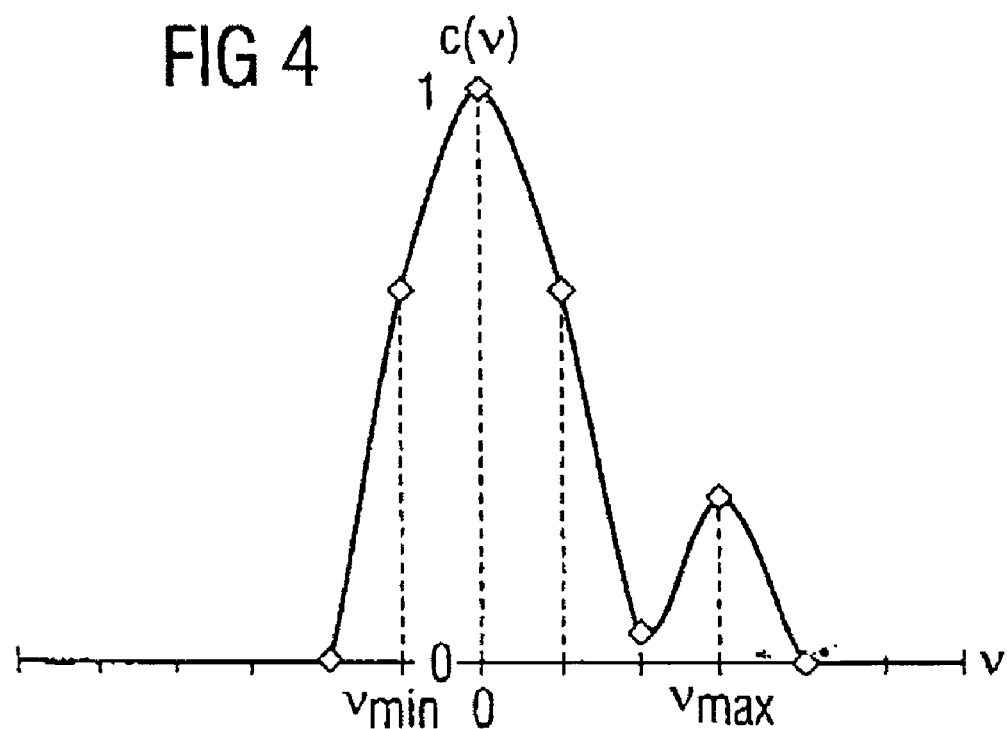
FIG. 4 shows a search pattern which is used as a reference signal.

FIG. 4 shows the search pattern contained in the virtual overall impulse response in FIG. 3. There is a main maximum in the search pattern at υmin, and a secondary maximum at υmax.

Figure 6:
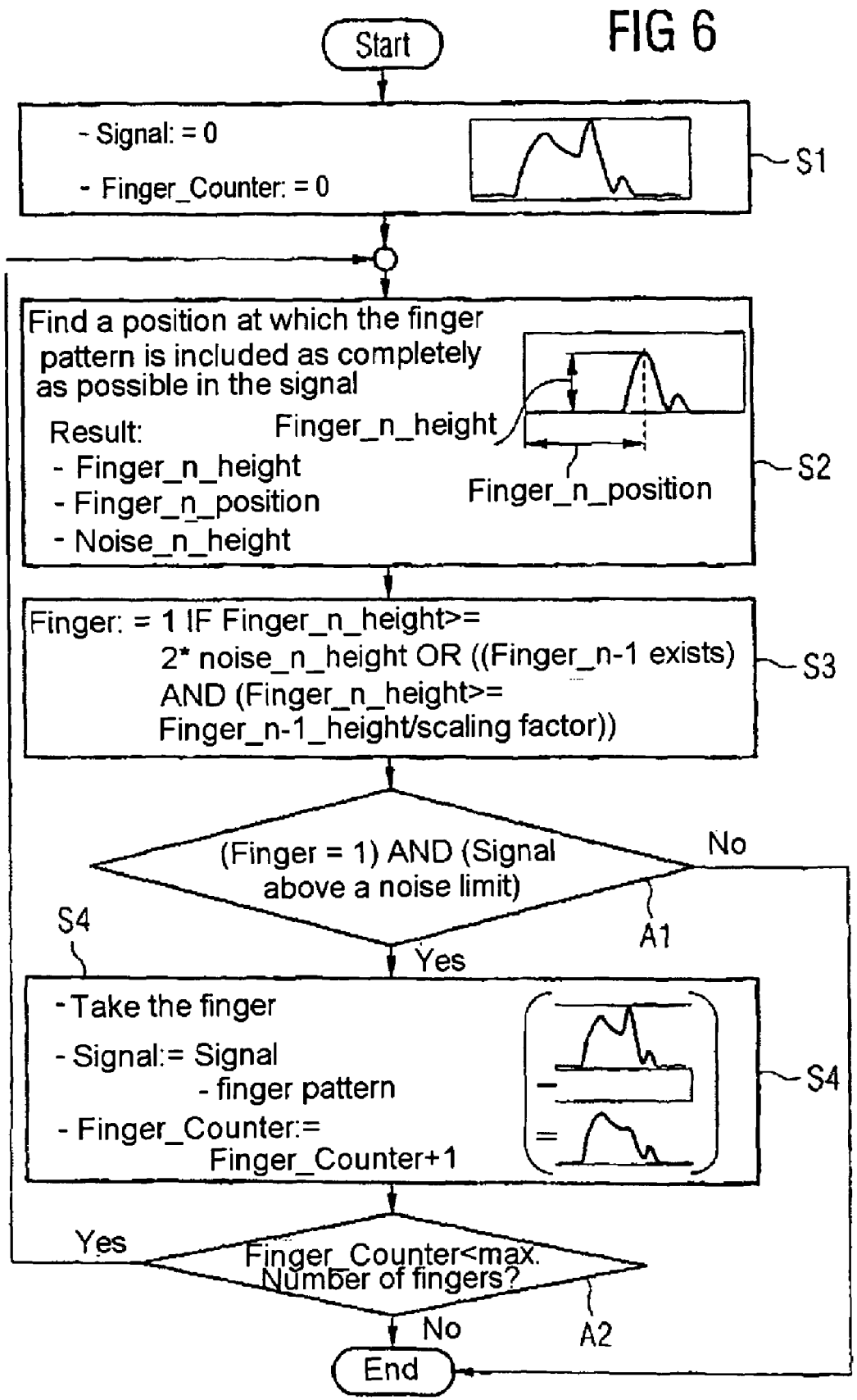
FIG. 6 shows a flowchart of one exemplary embodiment of the method according to the present invention.

The flowchart which is illustrated in FIG. 6 shows the steps which are used according to the present invention to extract the individual finger positions from an overall impulse response. In a first step S1, the impulse response received by a receiver from one mobile radio channel is subjected to matched filtering. A finger position counter is set to zero. In a second step S2, the overall impulse response is then cross-correlated with a reference function. The result of the cross-correlation is processed in a third step S3, which is used to find a maximum of the result of the cross-correlation and a proportionality factor α. This is followed by a question step A1, in which a check is carried out to determine whether the maximum is a finger. If it is found that the maximum is not a finger, the method is ended, since the "residual" overall impulse response now contains only noise components. Otherwise, the maximum is stored in a step S4 as a defined finger position, and the overall impulse response is reduced by the search pattern or reference signal that has been scaled using the proportionality factor α. The finger position counter is also implemented. The next question step A2 checks whether the value of the finger position counter has already exceeded a predetermined value. The predetermined value corresponds to a predetermined number of maxima or finger positions. This is because the method can be terminated after a specific number of maxima or finger positions. Typically, this number of maxima or finger positions corresponds to the "fingers" of a RAKE receiver. However, if the predetermined value has not yet been reached, the method is continued with the step S2.

The way in which the search pattern is identified in the overall impulse response will be explained briefly in the following text, using the least error squares method. Specifically, this means that the search pattern in the overall impulse response is in fact identified where the square of the error between the overall impulse response and a virtual overall impulse response (which has only one propagation path) is a minimum. This is essentially obtained by the cross-correlation. In other words, there is a finger position at the point at which the cross-correlation of the overall impulse response with the search pattern or the reference signal is a maximum. For this case, the proportionality factor α has particular importance. This is because the overall impulse response is reduced by the search pattern or reference signal that has been scaled by α.

Figure 7:
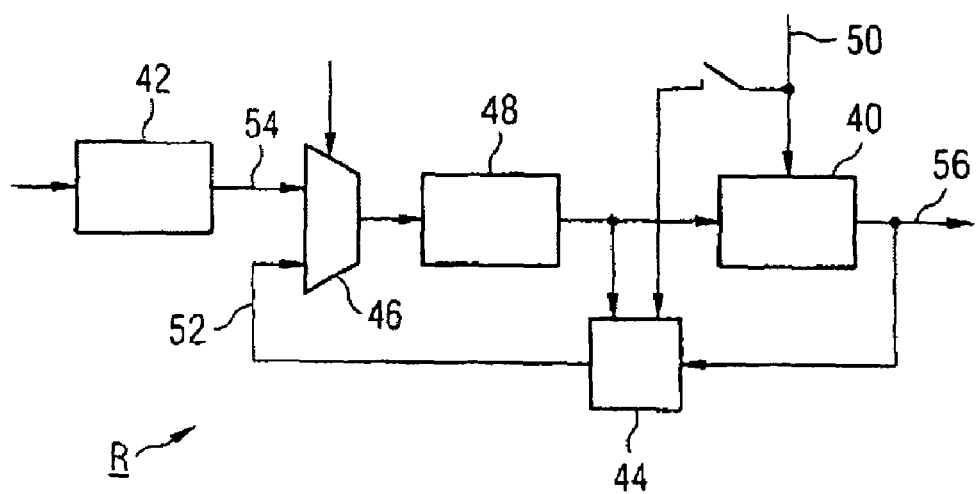
FIG. 7 shows a block diagram of one embodiment of the receiver according to the present invention.

FIG. 7 shows the essential parts in a receiver R for carrying out the method according to the present invention. In this sense, the receiver R includes a cross-correlator 40, a matched filter 42 and a subtractor and scalar 44. A multiplexer 46 is also provided whose output signal is supplied to an impulse response memory.

A data signal which has been transmitted via a mobile radio channel is supplied to the matched filter 42 and the receiver R. The matched filter 42 is used for equalization of the received data signal. At its output signal, the matched filter 42 produces the overall impulse response 54 of the mobile radio channel. The overall impulse response 54 is supplied to a first input of a multiplexer 46. The overall impulse response 54 can be supplied via the multiplexer 46 to an impulse response memory 48 which is used for temporary storage of the sample values of the overall impulse response. The output signal from the impulse response memory 48 is supplied to the cross-correlator 40, and to the subtractor and scalar 44. The cross-correlator 40 cross-correlates the overall impulse response, as stored in the impulse response memory 48, with a reference signal 50 that has been supplied. The output signal from the cross-correlator 40 is a finger position signal 56 and is supplied to the subtractor and scalar 44, to which the reference signal 50 also can be supplied, via a switch. First of all, the subtractor and scalar 44 scales the reference signal 50 that has been supplied via the switch, corresponding to the finger position signal 56. It then reduces the supplied overall impulse response, as temporally stored in the impulse response memory 48, by the scaled reference signal 50. The subtraction output signal 52 is supplied as a second input signal to the multiplexer 46.

The RAKE receiver R operates as follows:

A signal which is received via an antenna (which is not illustrated) is subjected to the conventional signal preprocessing, and is supplied to the matched filter 42. The output signal from the matched filter 42 is the overall impulse response 54, and is temporally stored directly in the impulse response memory 48 via the multiplexer. To be more precise, the impulse response memory 48 stores sample values of the overall impulse response 54. The overall impulse response which has been temporally stored in the impulse response memory 48 is processed via the correlator 40 and the subtractor and scalar 44 using the method according to the present invention. After processing, the multiplexer 46 is switched to the second input; that is to say, the subtraction output signal 52 is temporally stored in the impulse response memory 48 via the multiplexer 46. The overall impulse response which has been temporally stored in the impulse response memory 48 is now processed via a controller (which is not illustrated) using the method according to the present invention until either the finger position signal 56 does not indicate any more new finger positions, or a predetermined number of finger positions already have been determined. This may be done, for example, simply by counting the finger positions which are signaled by the finger position signal 56.

Although the present invention has been described with reference to specific embodiments, those of skill in the art will recognize that changes may be made thereto without departing from the spirit and scope of the present invention as set forth in the hereafter appended claims.

The invention claimed is:

1. A method for detecting multipath signals received via a mobile radio channel for operation of a RAKE receiver, comprising:
   (a) cross-correlating an overall impulse response with a reference signal;
   (b) determining and storing a maximum of a result of the cross-correlation and of a proportionality factor $\alpha$;
   (c) reducing the overall impulse response by the reference signal scaled by $\alpha$; and
   (d) repeating steps (a) through (c) using the overall impulse response reduced by the scaled reference signal until one of a predetermined number of maxima have been obtained and the proportionality factor $\alpha$ falls below a predetermined value.

2. A method for detecting multipath signals as claimed in claim 1, wherein the reference signal is a window-limited impulse response of one path of the mobile radio channel.

3. A method for detecting multipath signals as claimed in claim 1, wherein the scaled reference signal substantially matches the cross-correlation maximum determined in step (b).

4. A method for detecting multipath signals as claimed in claim 1, wherein multiply and accumulate operations are substantially carried out while carrying out steps (a) through (d).

5. A RAKE receiver for detecting multipath signals received via a mobile radio channel, comprising:
   at least two paths for processing received multipath signals;
   a cross-correlator for cross-correlating an overall impulse response with a reference signal, wherein a maximum of a result of the cross-correlation and of a proportionality factor $\alpha$ are thereby determined;
   a memory for storing the overall impulse response and the maximum of the result of the cross-correlation and of the proportionality factor $\alpha$; and
   a subtractor and scaler for decreasing the overall impulse response by the scaled reference signal scaled by $\alpha$, until one of a predetermined number of maxima have been obtained and the proportionality factor $\alpha$ falls below a predetermined value.

6. A RAKE receiver for detecting multipath signals as claimed in claim 5, further comprising control logic for controlling the cross-correlator and the subtractor and scaler.

7. A RAKE receiver for detecting multipath signals as claimed in claim 5, further comprising a program for a signal processor for processing the multipath signals, wherein the cross-correlator, the memory and the subtractor and scaler are program routines in the program.

8. A RAKE receiver for detecting multipath signals as claimed in claim 5, further comprising logic which is one of programmable and hard-wired, wherein the cross-correlator, the memory and the subtractor and scaler are incorporated in the logic.

9. A RAKE receiver for detecting multipath signals as claimed in claim 8, wherein the logic is an Application-Specific Integrated Circuit (ASIC).

* * * * *